(12) United States Patent
Neely et al.

(10) Patent No.: US 10,973,170 B2
(45) Date of Patent: Apr. 13, 2021

(54) CUTTER ASSEMBLY WITH KNIFE GUARD AND KNIFE GUARD HOLDER

(71) Applicant: Deere and Company, Moline, IL (US)

(72) Inventors: Jesse R. Neely, Annawan, IL (US); Lucas Laudenbach, Davenport, IA (US); Gregory S. McCunn, Orion, IL (US)

(73) Assignee: Deere & Company, Moline, IL (US)

( * ) Notice: Subject to any disclaimer, the term of this patent is extended or adjusted under 35 U.S.C. 154(b) by 701 days.

(21) Appl. No.: 15/294,294

(22) Filed: Oct. 14, 2016

(65) Prior Publication Data

US 2018/0103581 A1 Apr. 19, 2018

(51) Int. Cl.
| | |
|---|---|
| *A01D 34/13* | (2006.01) |
| *A01D 34/16* | (2006.01) |
| *A01D 34/18* | (2006.01) |
| *A01D 34/04* | (2006.01) |
| *A01D 34/14* | (2006.01) |
| *A01D 101/00* | (2006.01) |

(52) U.S. Cl.
CPC ............ *A01D 34/16* (2013.01); *A01D 34/04* (2013.01); *A01D 34/14* (2013.01); *A01D 34/18* (2013.01); *A01D 2101/00* (2013.01)

(58) Field of Classification Search
USPC ............ 56/305, 298, 307–313; 37/446, 447, 37/450–460
See application file for complete search history.

(56) References Cited

U.S. PATENT DOCUMENTS

| | | | | |
|---|---|---|---|---|
| 10,581 | A * | 2/1854 | Bell | ............................... 56/298 |
| 936,063 | A | 10/1909 | Weigel | |
| 1,374,973 | A | 4/1921 | Witte | |
| 1,890,997 | A * | 12/1932 | Lane | ..................... E02F 9/2833 |
| | | | | 37/459 |
| 2,148,186 | A | 2/1938 | Buck | |
| 2,761,269 | A * | 9/1956 | Krause | ................... A01D 34/18 |
| | | | | 56/298 |
| 4,575,998 | A | 3/1986 | Brooks | |
| 4,625,439 | A * | 12/1986 | Johansson | ............. E02F 9/2833 |
| | | | | 172/713 |
| 5,123,237 | A * | 6/1992 | Lutz | ...................... A01D 34/18 |
| | | | | 56/298 |
| 6,085,510 | A * | 7/2000 | McDonnell | ............ A01D 57/10 |
| | | | | 56/12.9 |
| 8,151,547 | B2 | 4/2012 | Bich et al. | |
| 2009/0199529 | A1* | 8/2009 | Schroeder | ............. A01D 57/10 |
| | | | | 56/12.9 |
| 2012/0036819 | A1 | 2/2012 | Schmidt et al. | |
| 2012/0255339 | A1 | 10/2012 | Moxlow | |

(Continued)

OTHER PUBLICATIONS

European Search Report for EP 17196337.4 dated Mar. 9, 2018.

*Primary Examiner* — Thomas B Will
*Assistant Examiner* — Mai T Nguyen
(74) *Attorney, Agent, or Firm* — Rathe Lindenbaum LLP (57) ABSTRACT

A cutter assembly includes a knife guard holder to be removably connected to a cutter bar, a knife guard and an interface between the knife guard holder and the knife guard. The knife guard may have a knife channel to slidably guide a cutter knife. The interface extends between the knife guard holder and the knife guard to locate and releasably retain the knife guard with respect to the knife guard holder.

23 Claims, 10 Drawing Sheets

(56) References Cited

U.S. PATENT DOCUMENTS

2014/0215995 A1 8/2014 Cook et al.
2014/0230398 A1 8/2014 Cook et al.
2015/0082764 A1 3/2015 Johnson

* cited by examiner

CUTTER ASSEMBLY WITH KNIFE GUARD AND KNIFE GUARD HOLDER

BACKGROUND

Cutter assemblies are utilized in a wide variety of equipment for cutting various plants and growing medium. For example, cutter assemblies are found in combine harvesters, choppers, haybines, sicklebars and other agricultural implements. Such cutter assemblies may include knife guards that guide sliding and reciprocating movement of a cutting knife.

DETAILED DESCRIPTION OF EXAMPLES

Repair and replacement of knife guards is often difficult. Such repair or replacement may require complete disassembly of many components of the implement. For example, repair or replacement of a knife guard may frequently require the removal of bolts along with skid shoes. The removal of these components may require the use of tools. When such repair or replacement occurs in the field, the required tools may not be available or such parts, when removed, may become lost.

Disclosed herein are various examples of cutter assemblies that facilitate simpler and less time-consuming repair or replacement of knife guards. The example cutter assemblies facilitate removal and separation of knife guards from the cutter assembly with minimal use of or no use of tools. The example cutter assemblies further facilitate removal and separation of knife guards from the cutter assembly with a minimal number of fasteners or no fasteners or components, reducing the likelihood that such removed fasteners or components may be lost in the field. The example cutter assemblies further allow existing agricultural and other implements to be modified for their use. The example cutter assemblies further provide for the use of less complex, lighter weight and less expensive knife guards.

Disclosed herein is an example cutter assembly that may include a knife guard holder to be removably connected to a cutter bar, a knife guard an interface between the knife guard holder and the knife guard. The knife guard may have a knife channel to slidably guide a cutter knife. The interface extends between the knife guard holder and the knife guard to locate and releasably retain the knife guard with respect to the knife guard holder.

Disclosed herein is an example knife guard that may comprise an integral unitary polymer body, a first metal plate and a second metal plate. The polymer body may comprise a bar, a plurality of pointed fingers forwardly projecting from the bar and a plurality of wedge-shaped projections projecting rearwardly from the bar. The plurality of wedge-shaped projections are to be received within a corresponding plurality of wedge-shaped cavities. At least one of the pointed fingers forms a knife channel. The first metal plate may continuously extend across and be secured to the plurality of pointed fingers with the first metal cutter plate forming a floor of the knife channel. The second metal plate may be secured to the at least one of the pointed fingers forming the knife channel, wherein the second metal plate forms a ceiling of the knife channel.

Disclosed herein is an example method for assembling a cutter assembly. The method may comprise removably mounting a knife guard holder to a cutter bar, wherein the knife guard holder comprising one of wedges and wedge-shaped cavities. The method may further comprise mounting a knife guard to the knife guard holder by inserting the other of the wedges and the wedge-shaped cavities of the knife guard into said one of the wedges and wedge-shaped cavities of the knife guard holder.

Figure 1:
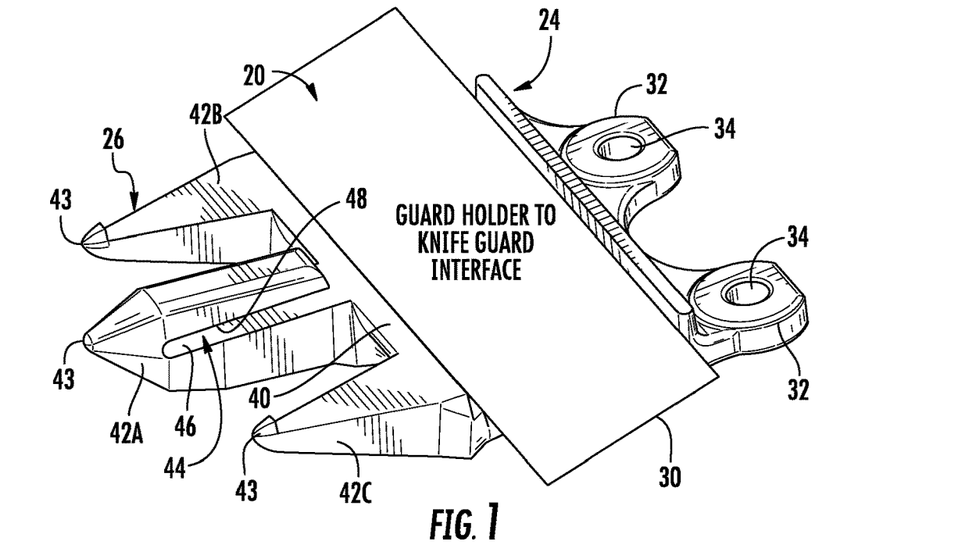
FIG. 1 is a perspective view of an example cutter assembly, with portions schematically shown).

FIG. 1 is a perspective view of a portion of an example cutter assembly 20 that facilitates the repair or replacement of a knife guard. Cutter assembly comprises knife guard holder 24, knife guard 26 and interface 30 (schematically illustrated). Knife guard holder 24 comprises a portion that is configured to be removably coupled to a cutter bar, also sometimes referred to as a staff, and that is to further configured to be removably coupled to knife guard 26 by interface 30.

For purposes of this disclosure, the phrase "configured to" denotes an actual state of configuration that fundamentally ties the stated function/use to the physical characteristics of the feature proceeding the phrase "configured to". For purposes of this disclosure, the term "releasably" or "removably" with respect to an attachment or coupling of two structures means that the two structures may be repeatedly connected and disconnected to and from one another without material damage to either of the two structures or their functioning.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

In the example illustrated, knife guard holder 26 is configured to be directly coupled to a cutter bar. In one implementation, knife guard holder 26 is formed from steel, aluminum or iron. Knife guard holder 26 comprises a pair of rings 32 having fastening apertures 34 through which fasteners, such as bolts, may pass and be connected to the cutter bar. In other implementations, knife guard holder 26 may comprise other mechanisms for releasable mounting and securing of knife guard holder 26 to a cutter bar or other frame structure of an agricultural implement.

Knife guard 26, also sometimes referred to as a sickle guard, comprises a device removably mounted to knife guard holder 26 by interface 30 and configured to guide sliding and reciprocating movement of a cutter or knife. Knife guard 26 comprises bar 40 and a plurality of forwardly projecting, generally pointed, fingers 42A, 42B and 42C (collectively referred to as fingers 42) having tips or noses 43. Fingers 42 project forwardly from bar 40 in a direction away from holder 24. At least one of fingers 42 comprise a rearwardly facing knife channel 44 that slidably receives portions of a knife, namely, knife sections of the knife. The knife channel 44 comprises both a bottom surface or floor 46 and an opposite upper surface or ceiling 48 defined by the finger 42.

In the example illustrated, knife guard 26 comprises three fingers 42: a middle or central finger 42A that comprises knife channel 44 and two lateral or side fingers 42B and 42C that are to underlie the knife without projecting over the knife. In other implementations, knife guard 26 may have other arrangements of fingers 42. For example, in other implementations, knife guard 26 may alternatively comprise a pair of fingers 42 which each of fingers 42 having a configuration similar to finger 42A. In yet other implementations, knife guard 26 may alternatively comprise a pair of fingers 42, with one of fingers 42 being configured similar to finger 42A and with the other of the fingers 42 being configured similar to finger 42C. In still other implementations, knife guard 26 may comprise more than three fingers 42, wherein the multiple fingers 42 have various combinations of fingers similar to finger 42A and fingers similar to fingers 42B and 42C.

In one implementation, knife guard 26 is formed from a metal material. For example, one implementation knife guard 26 is formed from a cast steel, aluminum, iron or various metal alloys. In yet another implementation, knife guard 26 is formed from a ceramic or polymer material. For example, in one implementation, knife guard 26 may be formed from a composite glass reinforced polymer. In some implementations, knife guard 20 formed from a ceramic or polymer, wherein those portions of knife guard 26 that contact the knife are provided with a metal surface. As will be described hereafter, in some implementations, knife guard 26 may comprise a polymer outer body with metal plates that interface with the reciprocating knife. As will be described hereafter, in some implementations, knife guard 26 may comprise a polymer outer body with a metal insert or core at least partially encapsulated by the polymer outer body.

Interface 30 comprises a mechanical interconnection between knife guard holder 24 and knife guard 26. Interface 30 locates and retains knife guard 26 relative to knife guard holder 24. Interface 30 facilitates removable separation of knife guard holder 24 and knife guard 26. In one implementation, interface 30 comprises cooperating portions of both knife guard holder 24 and knife guard 26. Interface 30 facilitates a releasable connection of knife controller 24 to knife guard 26 in a fashion so as to reduce or eliminate fasteners and so as to reduce or eliminate reliance upon tools for such disconnection. Interface 30 may enable quicker and easier separation of knife guard 26 for repair and/or replacement.

In one implementation, interface 30 comprises male and female connection portions associated with the knife guard holder 24 and the knife guard 26, wherein the male connection portion mates with the female connection portion to facilitate releasable connection of knife guard holder 24 to knife guard 26. In one implementation, the interface comprises male and female connection portions that wedge within one another. For example, in one implementation, interface 30 comprises a tapering wedge-shaped projection and a tapering wedge-shaped cavity that receives the projection. The wedge-shaped rejection tapering wedge shaped cavity take primary and secondary loads during operation of cutter assembly 20.

In some implementations, additional or alternative retaining mechanisms may be employed to secure knife guard 26 to knife guard holder 24. For example, in one implementation, the male connection portion may additionally comprise a catch or dovetail that resiliently snaps into a detent or that resiliently snaps behind an edge of the female connection portion. In one implementation, interface 30 may comprise a spring pin or quarter turn locking device to releasably secure knife guard 26 to knife guard holder 24. In one implementation, the interface 30 may additionally or alternatively utilize magnetic attraction to assist in retaining the connection of knife guard 26 and knife guard holder 24. For example, one or both of the male connection portion and the female connection portion may include a magnetized material or magnet. One of the male connection portion and the female connection may include a magnetized material or magnet while the other of the male connection portion and the female connection portion comprises a ferrous material. In yet another implementation, the knife guard holder 24 and knife guard 26 may comprise aligned channels that removably receive a retention pin.

Figure 2:
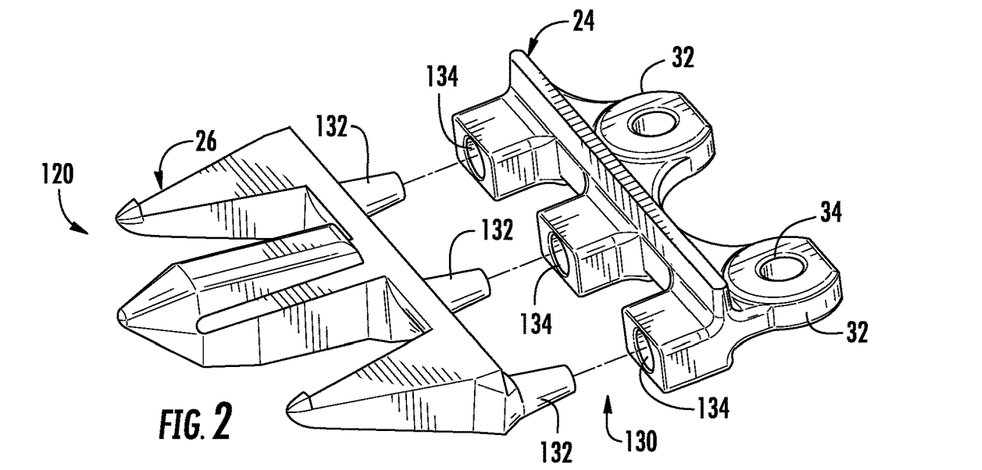
FIG. 2 is an exploded perspective view of another example cutter assembly.

FIG. 2 is an exploded perspective view of a portion of another example cutter assembly 120 comprising knife guard holder 24, knife guard 26 and a specific example interface 130. Interface 130 comprises tapering wedge-shaped projections 132 and corresponding internally tapering wedge-shaped cavities 134. In the example illustrated, projections 132 and cavities 134 have frustro-conical shapes. In other implementations, projections 132 and cavities 134 may have other corresponding tapering wedge-shapes. For example, projections 132 and cavities 134 may alternatively have tapering polygonal cross-sectional shapes, such as a flat-top pyramid shape. Although projections 132 are illustrated as being provided as part of knife guard 26, projecting rearwardly from bar 40 while cavities 134 are illustrated as being provided as part of knife guard holder 24, projecting forwardly from rings 32, in other implementations, this relationship may be reversed such that projections 132 extend forwardly from rings 32 of knife guard holder 24 while cavities 134 are formed within or project rearwardly from bar 40.

Figure 3:
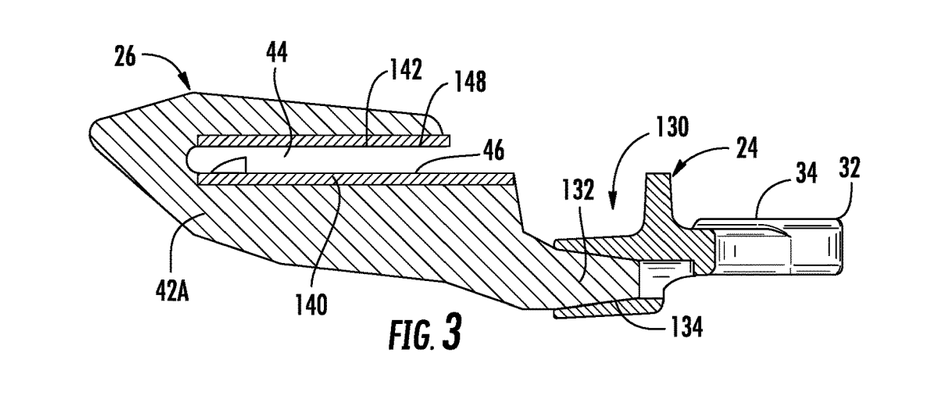
FIG. 3 is a sectional view of the example cutter assembly of FIG. 2.

FIG. 3 is a sectional view, through finger 42A, illustrating interface 130 removably connecting knife guard 26 to knife guard holder 24. As shown by FIG. 3, projections 132 are wedged into cavities 134, inhibiting relative movement therebetween but for movement of knife guard 26 in a forward direction. As the forces imposed upon knife guard 26 during use tend to further move knife guard 26 rearwardly, to the right in the illustrated figure, projections 132 are less likely to become accidentally dislodged from cavities 134.

FIG. 3 further illustrates a variation of knife guard 26, wherein the outer body of knife guard 26 may be formed from a polymer material or a combination of materials that may be susceptible to abrasion wear from a reciprocating knife and wherein portions of knife channel 44 that might otherwise contact and wear against knife are provided with a layer 140, 142 of a different material more resistant to abrasion and/or having a lower coefficient of friction as compared to the other materials of the outer body of knife guard 26. For example, in one implementation, layers 141, 142 may comprise metal plates secured to the polymer outer body of knife guard 26. In one implementation, such metal plates may be fastened to the remainder of knife guard 26, may be bonded to the remainder of knife guard 26 and/or may be mechanically locked to the remainder of knife guard 26 such as where the remainder of knife guard 26 is molded and encapsulates selected portions of the metal plates. In another implementation, layers 141, 142 may comprise a lamination or coating on the remainder of knife guard 26. In such implementations, layers 141, 142 may provide sharp edges that cooperate with the knife to further facilitate cutting.

Figure 4:
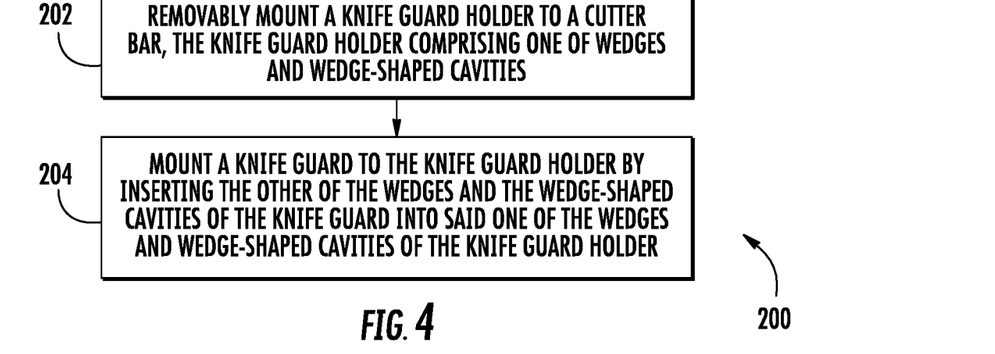
FIG. 4 is a flow diagram of an example method for assembling a cutter assembly.

FIG. 4 is a flow diagram of an example method 200 for assembling a cutter assembly. Method 200 facilitates separation of the knife guard from the remainder of an implement with minimal or no use of tools and with minimal or no use of fasteners. Although method 200 is described in the context of being carried out with interface 130 between knife guard holder 24 and knife guard 26, it should be appreciated that method 200 may be carried out with any of the knife guards and knife guard holders, and their respective interfaces, describing this disclosure or other interfaces having similar characteristics. It should further be appreciated that method 200 may be reversed to facilitate removal and separation of knife guard 26 from the remainder of an implement.

As indicated by block 202, knife guard holder 24 is removably mounted to a cutter bar. In one implementation, fasteners are inserted through fasting apertures 34 and connected to portions of the cutter bar. Knife guard holder 24 comprises one of wedges 132 and wedge-shaped cavities 134.

As indicated by block 204, knife guard 26 is mounted to knife guard holder 24 by inserting the other of the wedges and the wedge-shaped cavities of the knife guard into said one of the wedges and wedge-shaped cavities of the knife guard holder. In the example illustrated, wedges 132 of knife guard 26 are inserted into wedge-shaped cavities 134 of knife guard holder 24.

Figure 5:
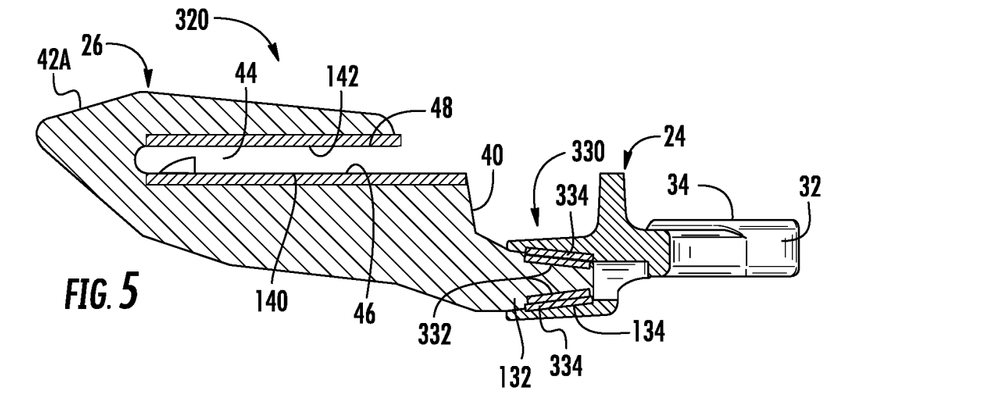
FIG. 5 is a sectional view of another example cutter assembly.

FIG. 5 is a sectional view of a portion of an example cutter assembly 320, wherein the assembled knife guard holder 24 and knife guard 26 are removably connected to one another by yet another example interface 330. Those components of cutter assembly 320 which correspond to components of cutter assembly 120 are numbered similarly.

Interface 330 is similar interface 130 described above in that interface 330 comprises tapering wedge-shaped cavities 134 in which wedges 132 are wedged. In contrast to interface 130, projections 132 and cavities 134 are additionally lined or coated with layers 332 and 334, respectively. In one implementation, layers 332 and 334 form external and internal sleeves that completely surround wedges 132 and the interior surfaces of cavities 134. In another implementation, one or both of layers 332 and 334 may only partially extend about the circumference of projections 132 and cavities 134.

In one implementation, layers 332, 334 are formed from materials different than the adjacent materials of projections 132 and cavity 134 so as to provide abrasion resistance, reducing abrasion. In another implementation, layer 322 and 334 are formed from materials different than the adjacent materials of projections 132 and cavity 134 so as to provide enhanced gripping, wherein layers 132 and 134 have a higher relative coefficient of friction with respect to one another as compared to the materials of projections 132 and cavity 134.

In yet other implementations, layer 332 and 334 are formed from materials different than the adjacent materials of projections 132 and cavity 134 so as to provide magnetic attraction between projections 132 and knife guard holder 24. For example, in one implementation, both of layers 332, 334 may be formed from a magnet or a magnetized material. In yet another implementation, one of layer 332, 334 may be formed from a magnet or a magnetized material of the other of layer 332, 334 is formed from a ferrous material or material that is attracted to the magnet. In some implementations, at least portions of wedges 132 may be entirely formed from a ferrous material while cavity 134 comprises the magnet such that layer 332 may be omitted. In some implementations, at least portions of cavity 134 may be entirely formed from a ferrous material while wedges 132 comprise a magnet such that layer 334 may be omitted. In implementations where layer 332 and 334 are provided for magnetic attraction and retention, one or both of layer 332, 334 may be alternatively embedded within the material of wedges 132 or the material of knife guard holder 24 about cavity 134, covered by a thin layer of nonferrous or nonmagnetic material. For example, in one implementation, holder 24 may be formed from a ferrous material, wherein wedges 132 completely surround and embed an internal magnet.

Figure 6:
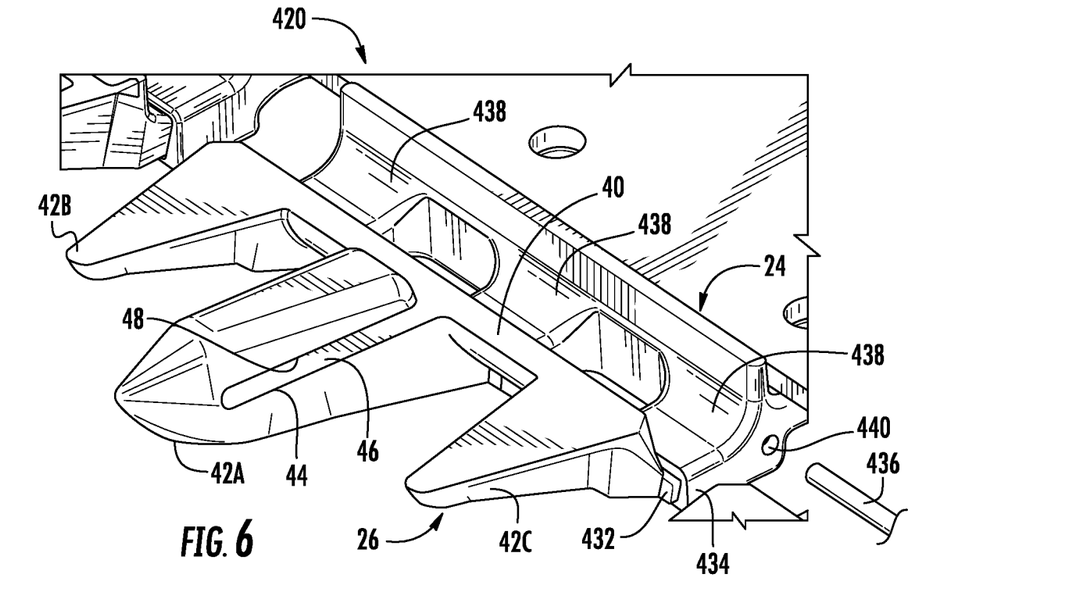
FIG. 6 is a fragmentary, partially exploded perspective view of another example cutter assembly.
Figure 7:
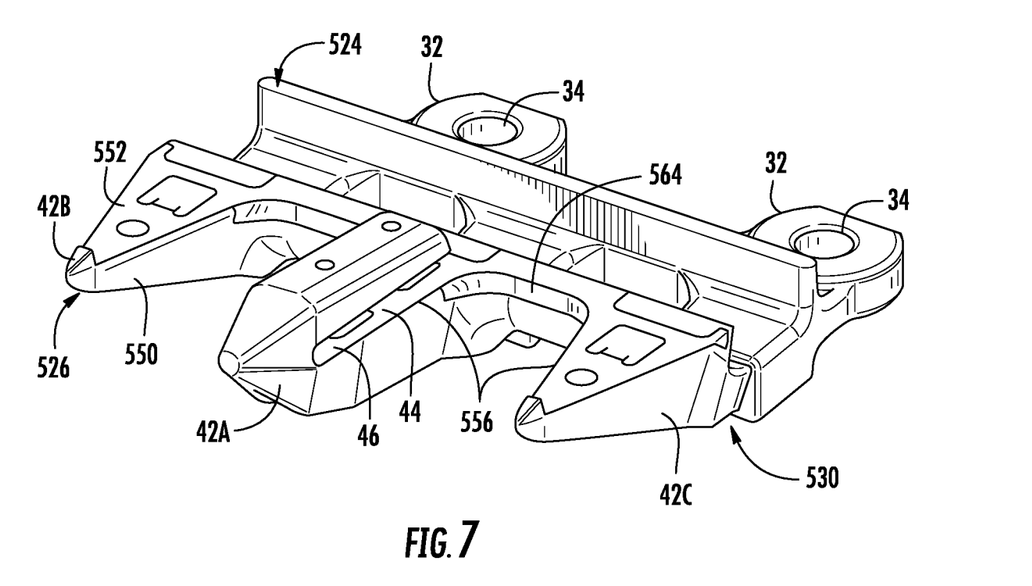
FIG. 7 is a front perspective view of another example cutter assembly.

FIG. 6 illustrates a portion of another example cutter assembly 420 comprising knife guard holder 24, knife guard 26 and another example interface 430. Interface 430 utilizes a pair of aligned channels and a retention pin to releasably retain and secure knife guard 26 to knife guard holder 24. Those components of cutter assembly 420 which correspond to components of cutter assembly 20 or cutter assembly 120 are numbered similarly.

Interface 430 comprises extensions 432, cavities 434, and retention pin 436. Extensions 432 rearwardly project from bar 430 and form aligned channels 438. In the example illustrated, extensions 432 have hook or claw-shaped ends that form the aligned channels 438. In other implementations, extensions 432 may alternatively comprise bores, completely surrounded by the material of extensions 432, wherein the bores have interiors forming the aligned channels 438.

Cavities 434 extend into portions of knife guard holder 24 and correspond to extensions 432 so as to removably receive extensions 432. Each of cavities 434 comprise side openings 440 that are aligned with channels 438 when extensions 432 are fully inserted into cavities 434. Side openings 440 provide aligned passages through knife guard holder 24 to facilitate insertion of retention pin 436 through each of side openings 440 and through channels 438 to inhibit withdrawal extensions 432 from cavities 434. In one implementation, extensions 432 and cavities 434 have cross-sections that do not taper. In another implementation, extensions 432 and cavities 434 have tapering cross-sections, further facilitating securement of extensions 432 within cavities 434 by the wedging of extensions 432 within cavities 434.

Retention pin 436 comprises an elongate shaft or pin configured to slidably pass through opening 440 and channels 438, extending across each of extensions 432 of knife guard 26. In one implementation, retention pin 436 comprises a cotter pin. In yet another implementation, retention pin 436 comprises a threaded bolt for use with an associated threaded nut. Removal of retention pin 436 allows extensions 432 to be manually pulled and withdrawn from cavities 434, facilitating separation of knife guard 26 from knife guard holder 24 and the remainder of the implement.

FIGS. 7-13 illustrate a portion of another example cutter assembly 520 comprising knife guard holder 524 and knife guard 526 releasably connected to one another by an interface 530. Knife guard holder 524 is similar to knife guard holder 24 described above except that knife guard holder 524 comprises portions of interface 530.

Figure 8:
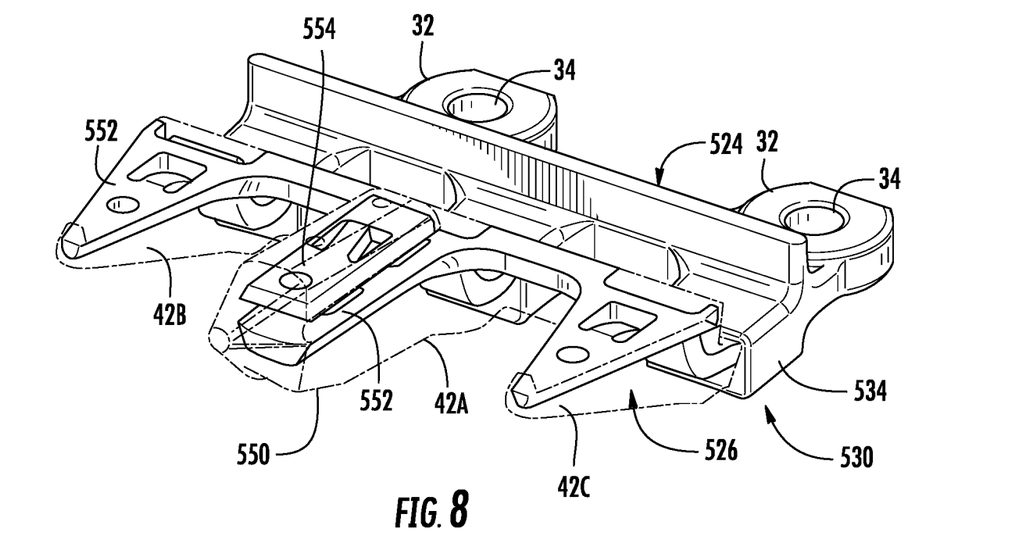
FIG. 8 is a perspective view of the cutter assembly of FIG. 7 with portions transparently shown.
Figure 9:
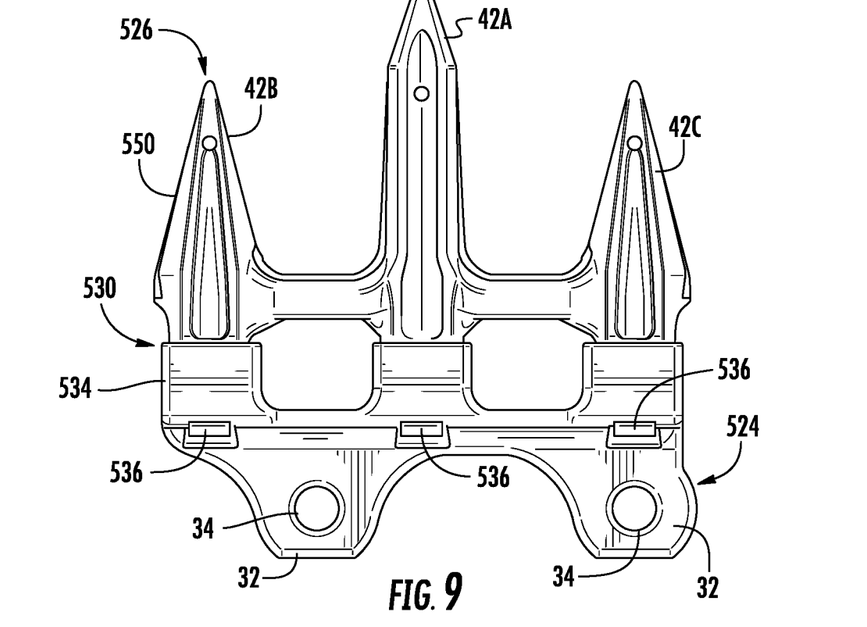
FIG. 9 is a bottom view of the cutter assembly of FIG. 7.
Figure 10:
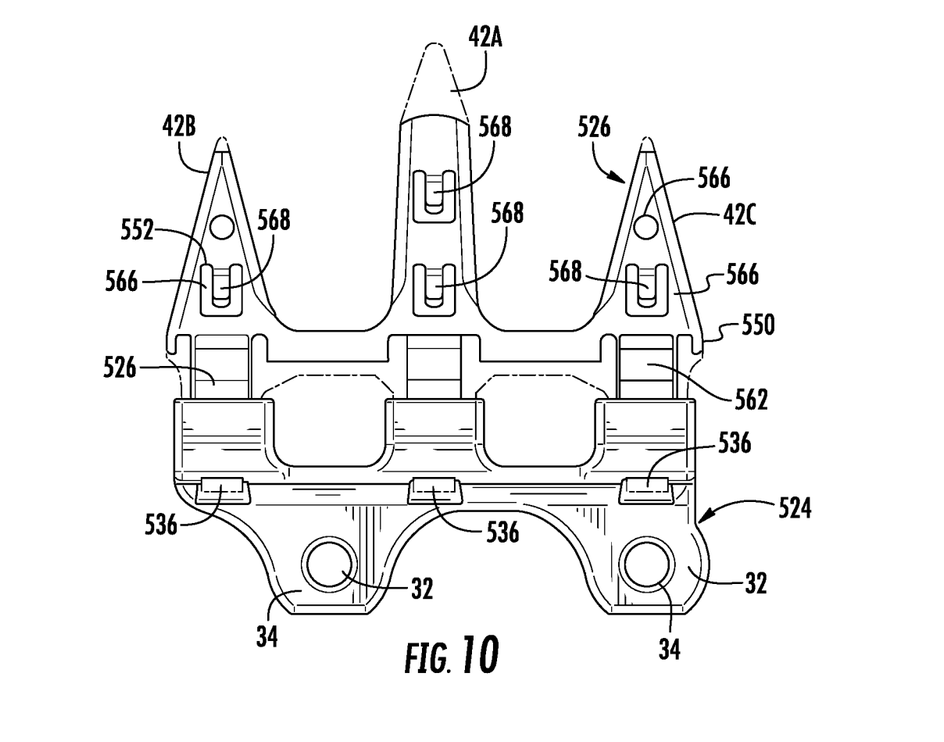
FIG. 10 is a bottom view of the cutter assembly of FIG. 7 with portions transparently shown.
Figure 11:
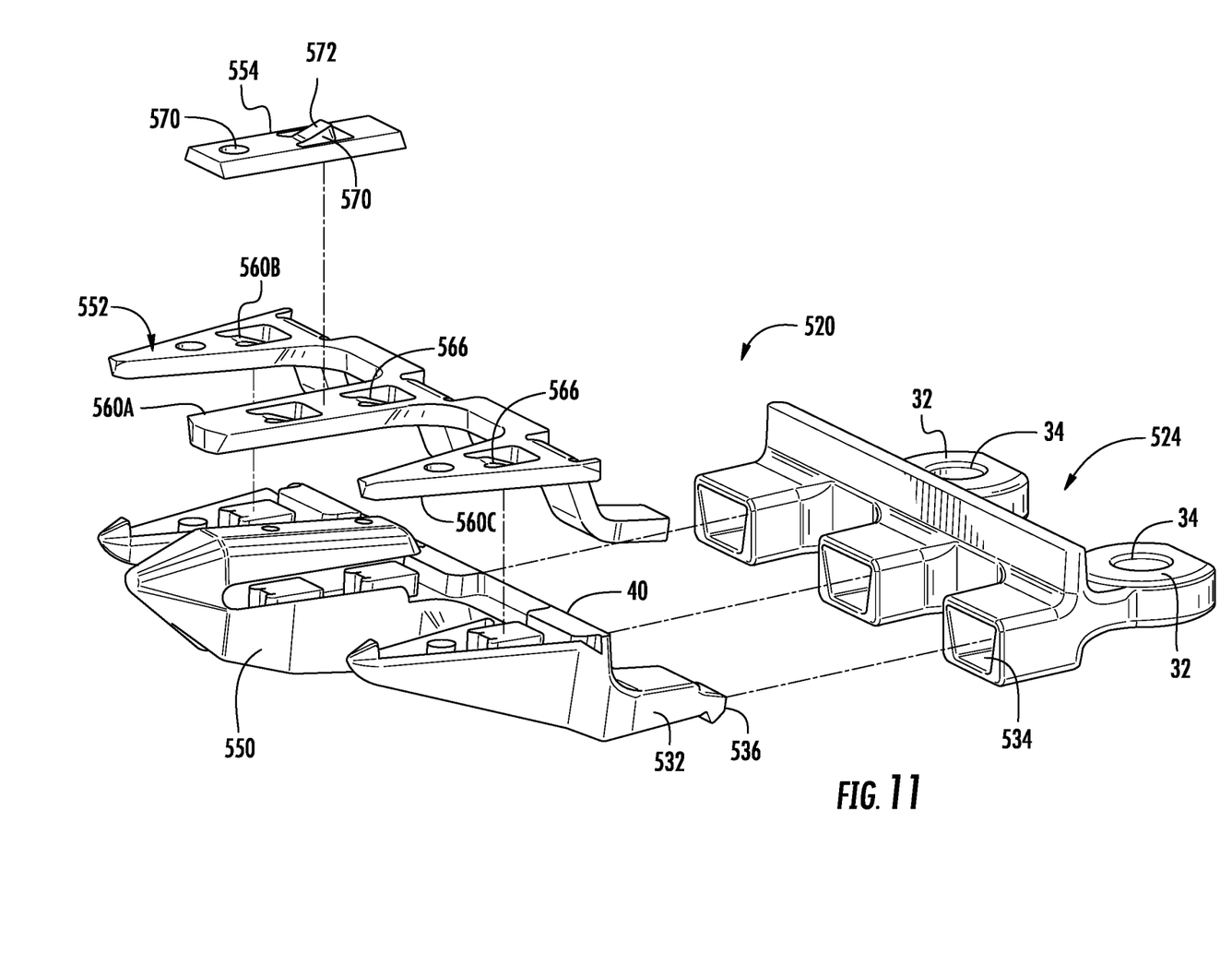
FIG. 11 is an exploded perspective view of the example cutter assembly of FIG. 7.
Figure 12:
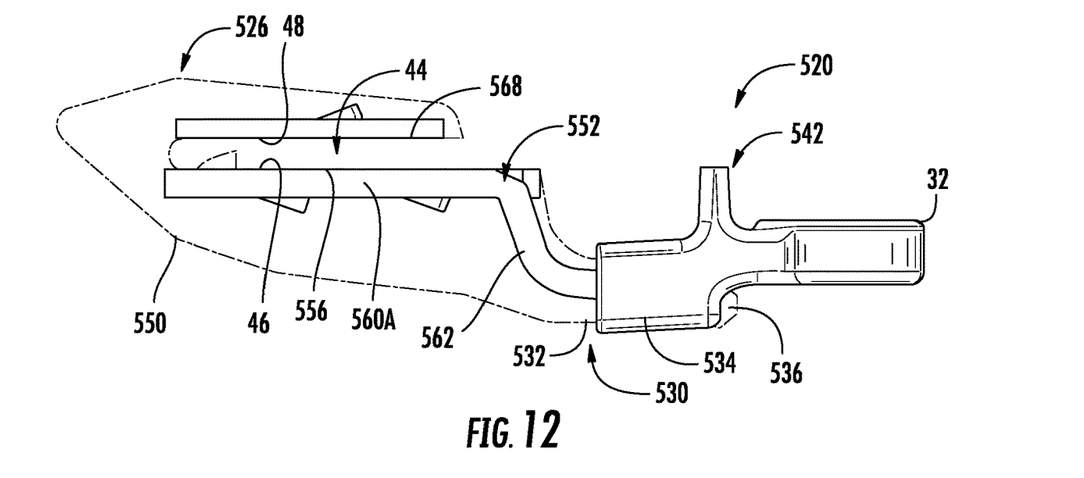
FIG. 12 is a side view of a portion of the example cutter assembly of FIG. 7 with portions transparently shown.
Figure 13:
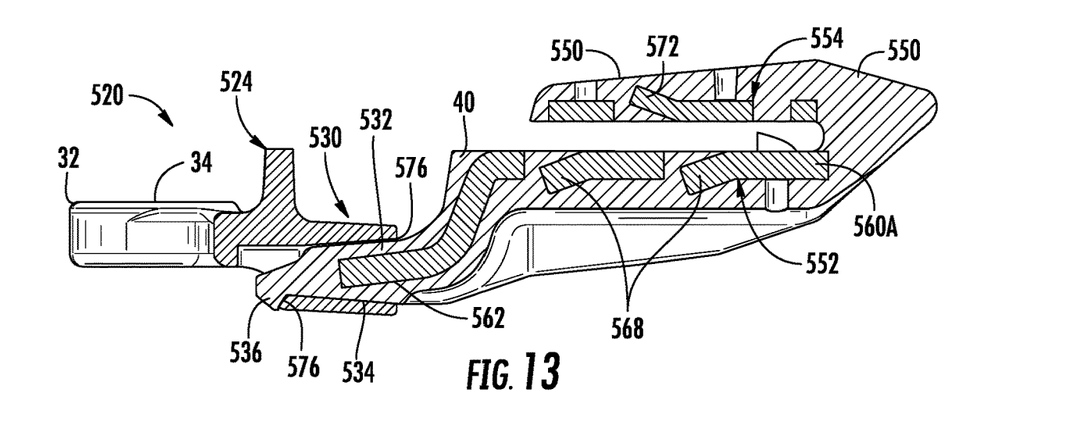
FIG. 13 is a sectional view of the example cutter assembly of FIG. 7.

Knife guard 526 is similar to knife guard 26 in that knife guard 526 comprises fingers 42 forwardly projecting from a bar 40, wherein at least one of the fingers 42 comprises a knife channel 44. As shown by FIG. 11, unlike knife guard 26, knife guard 526 is specifically illustrated as comprising an outer polymer body 550 and metal inserts 552, 554. FIG. 11 illustrates metal inserts 552, 554 exploded away from and separated from the outer polymer body 550. FIGS. 8, 10 and 12 transparently illustrate portions of outer polymeric body 552 illustrate the interrelationship between body 550 and metal inserts 552, 554. FIG. 13 is a sectional view through finger 42A.

Outer polymeric body 550 comprises a single integral unitary body form from a polymer or mixture of different polymers. In one implementation, outer polymer body 550 is formed from a material such as a composite glass reinforced polymer. The polymer material forming body 550 reduces the weight of cutter assembly 520 as well as its cost.

Outer polymeric body 550 forms bar 40 and each of fingers 42 described above. As shown by FIGS. 11 and 12, outer polymer body 550 extends about opposite sides of portions of metal inserts 552, 554 and/or within apertures within metal inserts 552, 554 to retain metal inserts 552, 554 relative to body 550 in at least one direction. As shown by FIG. 13, in one implementation, outer polymer body 550 is molded about metal inserts 552, 554 so as to at least partially encapsulate multiple pairs of opposite sides of metal insert 552 and 554 so as to mechanically lock inserts 552 and 524 in place without the use of adhesives, welding or fasteners. In other implementations, polymer body 550 may comprise projections that make within corresponding apertures in inserts 552 and 554 to assist in retaining metal insert 552 and 554 in place. In such implementations, insert 552 and 524 may additionally be glued, fuse or fastened to body 550.

Metal insert 552 comprises a metallic structure formed from a metal such as 1070 steel or various alloys. Metal insert 552 comprises a metal plates 560A, 560B and 560C (collectively referred to as metal plates 560) and extensions 562. Metal plates 560A, 560B and 560C extend above underlying portions of fingers 42A, 42B and 42C, respectively, providing metal layers upon which the knife of the cutter assembly rides. Metal plate 560A forms the lower surface or floor 46 of knife channel 44. Metal plates 560 further provide sharp metal edges, such as edges 564 and 556 that interact with such knives to facilitate cutting of the plants.

As indicated above, in the example illustrated, metal plates 560 comprise apertures 566 through which the polymer material of body 550 may extend and be captured. As illustrated by FIG. 13, each of metal plates 560 comprises at least one downwardly extending tang 568 which is completely encapsulated and surrounded by the polymer material of body 550. Such encapsulation further reliably secures and retains insert 552 in place with respect to body 550. In other implementations, tangs 568 and/or apertures 566 may be omitted.

Extensions 562 extend rearwardly from plates 560 and are completely encapsulated by polymer body 550. In the example illustrated, extensions 562 are completely encapsulated by those portions of polymer body 550 forming part of interface 530. Extensions 562 different and rigidify those portions of polymer body 550 forming part of interface 530. In the example illustrated, extensions 562 are integrally formed as a single unitary body with plates 560. In one implementation, extensions 562 and plates 560 are formed from a stamped and deformed sheet of metal. In other implementations, extensions 562 and plates 560 are formed through casting or molding.

Metal insert 554 comprises a metal plate secured to central finger 42A above knife channel 44. Metal insert 554 forms an upper surface or ceiling 48 of knife channel 44 and provide services against which the upper surface of the received knife may bear against. Similar to metal plate 560A, metal insert 552 provides sharp wear resistant metal edges, such as edge 568 (shown in FIG. 12), that interact with such knives to facilitate cutting of the plants.

In the example illustrated, metal insert 554 is a separate piece from metal insert 552. Similar to metal insert 552, metal insert 554 comprises apertures 570 through which the polymer material of body 550 may extend and be captured. As illustrated by FIG. 13, metal insert 552 may further comprise at least one upwardly extending tang 572 which is completely encapsulated and surrounded by the polymer material of body 550. Such encapsulation further reliably secures and retains insert 554 in place with respect to body 550. In other implementations, tang 572 and/or apertures 570 may be omitted. In some implementations, metal insert 554 may be bonded, snapped or fastened to body 550. In some implementations, in lieu of being a separate component from insert 552, insert 554 may be integrally formed as part of a single unitary body with insert 552, having a horizontal U shape and extending rearwardly from a front edge of metal plate 560A.

Interface 530 releasably connects knife guard holder 24 and knife guard 526. In the example illustrated, interface 530 comprises wedges 532, wedge-shaped cavities 534 and catches 536. Wedges 532 extend rearwardly from bar 40 and rearwardly taper, having a gradually rearwardly decreasing cross-sectional area. As shown by FIG. 13, in the example illustrated, wedges 532 are integrally formed as part of a single unitary body with bar 40 and the remainder of polymer body 550.

Wedges 532 surround portions of extensions 562 of metal insert 552. As shown by FIG. 13, extensions 562, along with wedges 532 are received within wedge-shaped cavities 534. As a result, as shown by FIG. 13, the junction 576 of projections 532 and cavities 534 is further stiffened and strengthened by the internal extension 562. In the example illustrated, each wedge 534 has a tapering flat pyramid or tapering trapezoidal cross section shape. In other implementations, each wedge 534 may have a conical or frustro-conical shape similar to projections 132 described above.

Wedge-shaped cavities 534 extend forwardly from a remainder of knife guard holder 524. Wedge-shaped cavities 534 are similar to wedge-shaped cavities 134 described above except that wedge-shaped cavities 534 have internally tapering trapezoidal cross sectional shapes. As indicated above, depending upon the shape of wedges 532, wedge-shaped cavity 534 may have other tapering internal cavity shapes.

Catch 534 comprise a hook or other projection extending from wedge 532 so as to resiliently snap into a corresponding detent or void within or at the end of the corresponding wedge-shaped cavity 534. In the example illustrated, each catch 534 comprises a dovetail. As shown by FIGS. 12 and 13, catch 536 contacts and engages an external edge 576 at the end of cavity 534 when wedges 532 have been sufficiently and fully inserted into (and through) cavities 534. In such an implementation, catches 536 not only retain wedges 532 within cavities 534 to prevent accidental withdrawal, but also provide a tactile indication of when wedges 532 have been sufficiently inserted into cavities 534. Withdrawal of wedges 532 from cavities 534 may be achieved by resiliently flexing catches 536 upwardly to clear edge 576.

Figure 14:
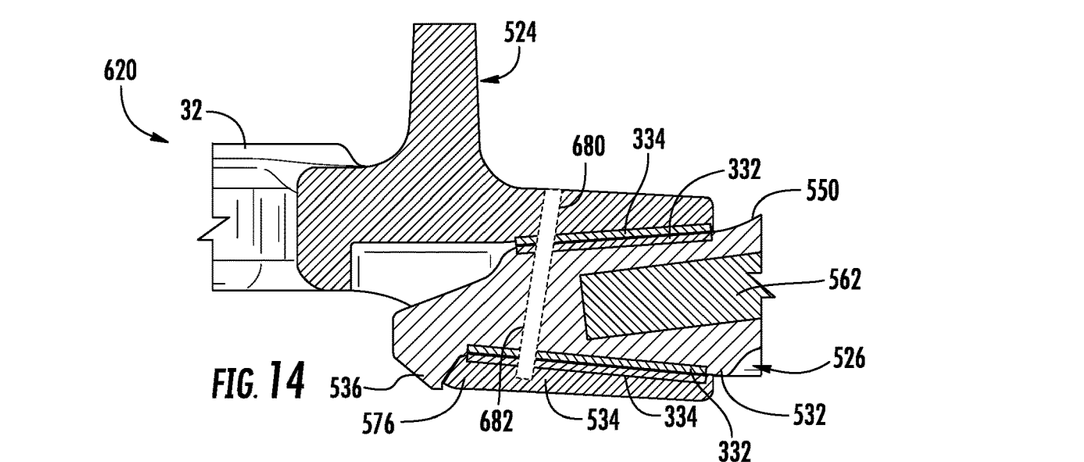
FIG. 14 is a fragmentary sectional view of a portion of another example cutter assembly.

FIG. 14 is a sectional view of a portion of another example cutter assembly 620. Cutter assembly 620 is similar to cutter assembly 520 described above except that cutter assembly 620 comprises additional retention features for retaining wedges 532 within cavities 534. In the example illustrated, cutter assembly 620 further comprises layer 332 and 334 as described above. As indicated above, in one implementation, layer 332 and 334 magnetically interact to assist in retaining wedges 532 within cavities 534. In the example illustrated, projections 532 and portions of knife guard holder 524 additionally comprise aligned channels 680 that receive a retention pin 682 (shown in broken lines) to further assist in retaining wedges 532 within cavities 534.

In some implementations, one or more of such features, layer 322, 334 or channel 680 and pin 682 may be omitted.

FIGS. 15-18 illustrate cutter assembly 520 as part of an example header 700 for a combine harvester 701. Header 700 is shown as a draper header. It should be appreciated that cutter assembly 520 may likewise be utilized in other harvester headers, such as auger platforms and rigid draper platforms. As indicated above, in some implementations, cutter assembly 520 may be utilized in other agriculture implements such as sickle bars and haybines.

Figure 15:
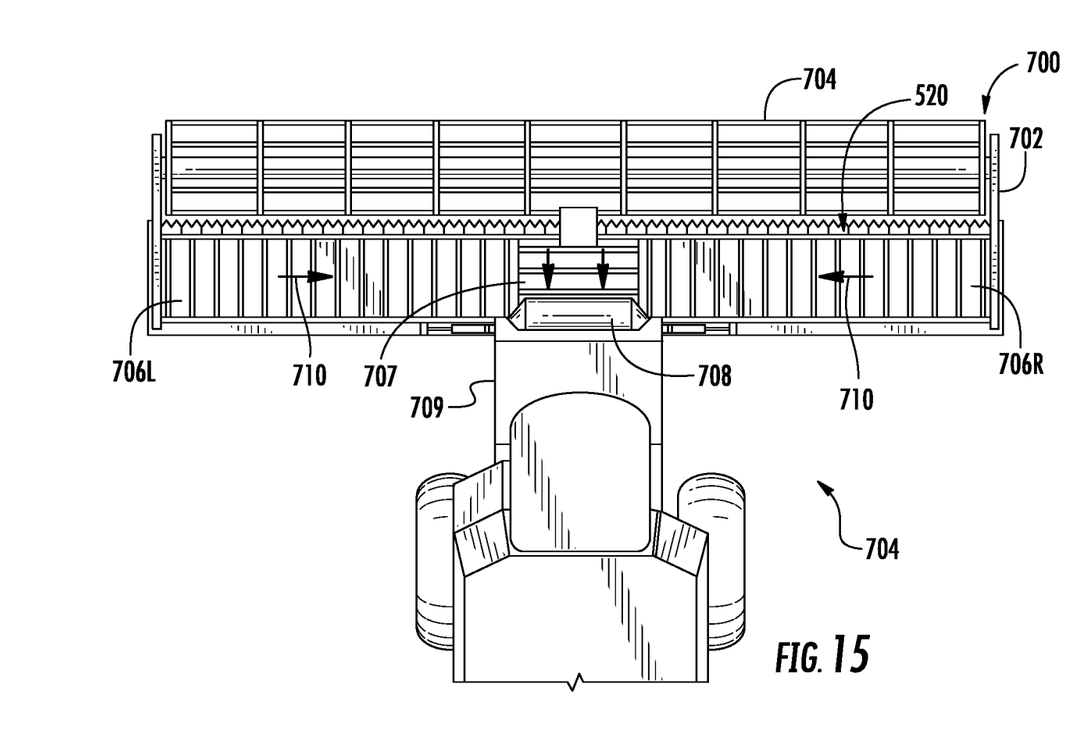
FIG. 15 is a front perspective view of an example harvester with an example harvester head.

As shown by FIG. 15, the example header 700 generally comprises frame 702, cutter assembly 520, gathering reels 704, drapers 706L, 706R (collectively referred to as draper 706), central draper 707 and feed drum 708. Frame 702 forms the exterior of header 700 and supports remaining components of header 700. Frame 702 is configured to be releasably mounted to a combine harvester 701.

Gathering reels 704 gathering direct the crop towards cutter assembly 520. Cutter assembly 520 cuts and are severs the crop or plant from soil. Drapers 706 comprise carpets, platforms or belts which are transversely driven so as to carry the severed plants or crops to central draper 707. Draper 706R carries the severed crops in the direction indicated by arrow 710 or draper 706L carrier severed crops in the direction indicated by arrow 711. Central draper 707 conveys the severed crop material to feed drum 708. Feed drum 708 is rotatably driven so as to move the severed crop material rearwardly into a feeder house 709 of harvester 701 for threshing.

Figure 16:
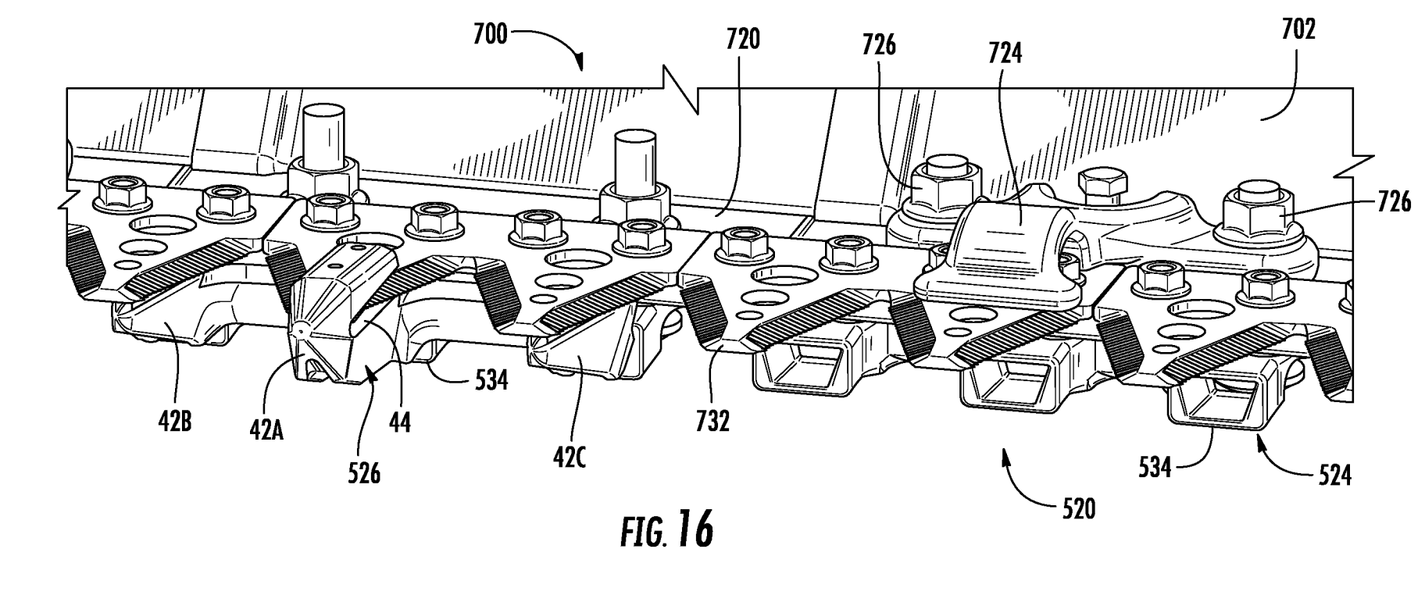
FIG. 16 is a fragmentary front top perspective view of a portion of the harvester head of FIG. 15.
Figure 17:
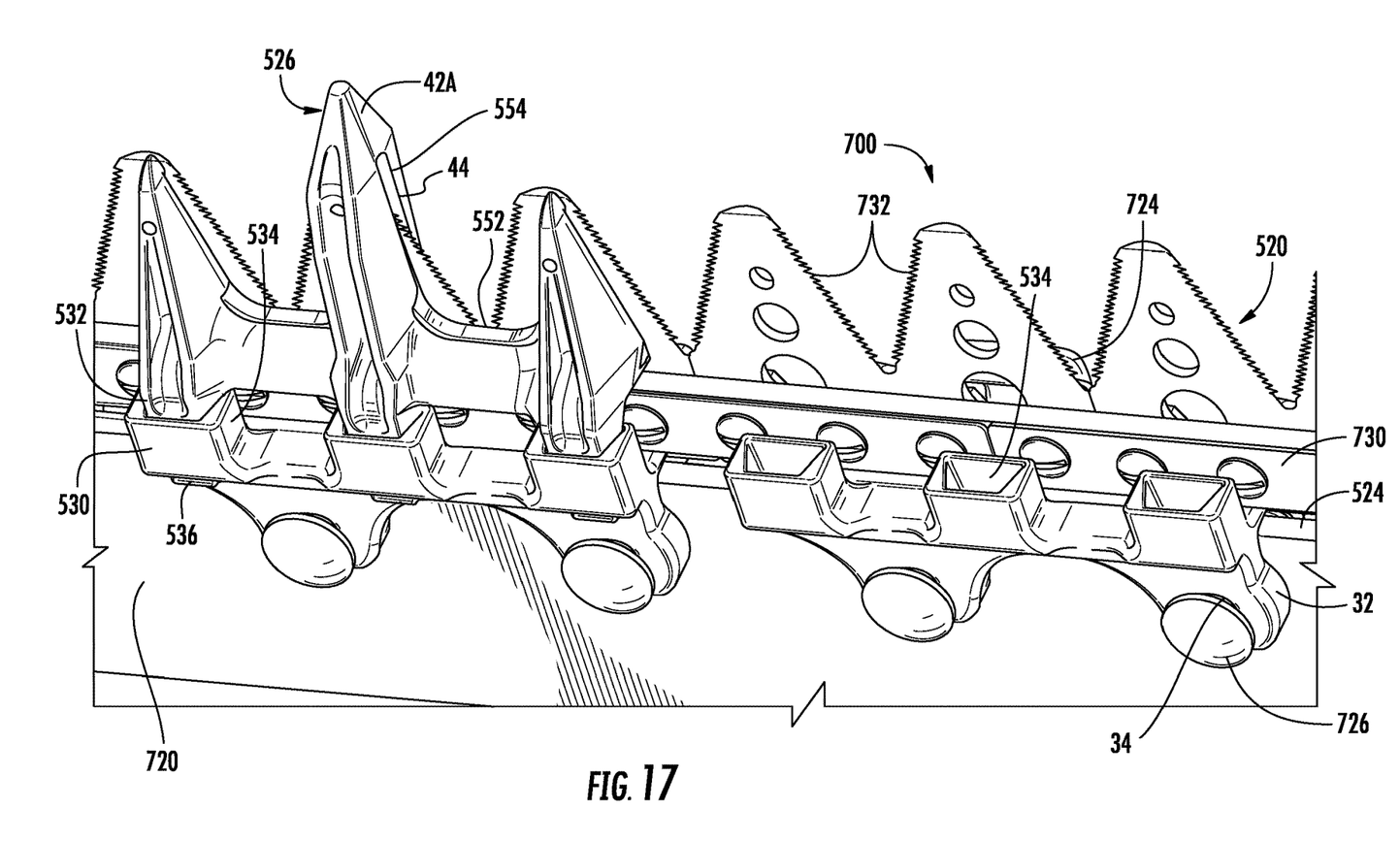
FIG. 17 is a front bottom perspective view of the portion of the harvester head of FIG. 16.
Figure 18:
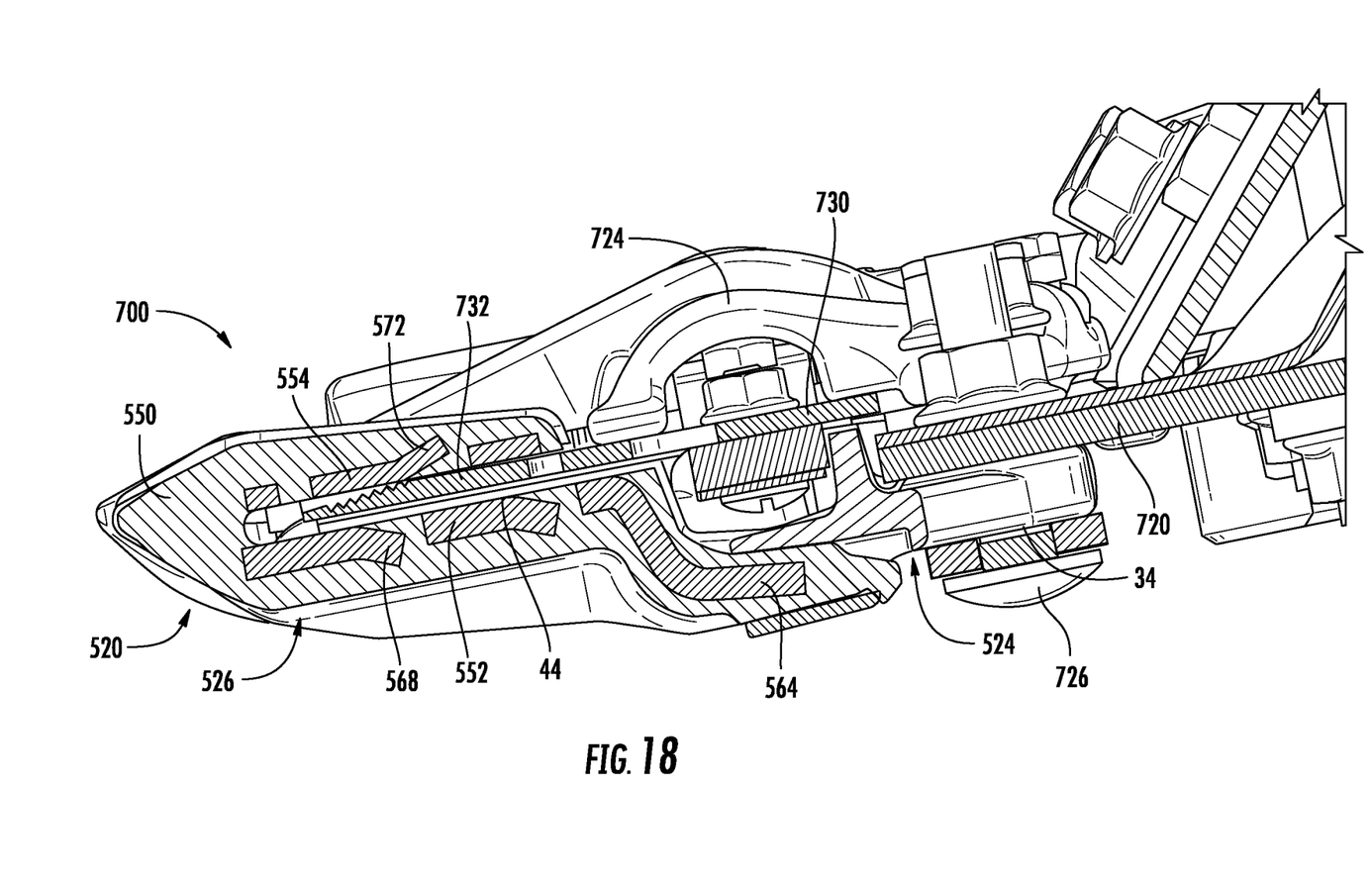
FIG. 18 is a sectional view of a portion of the harvester head of FIG. 15.

FIGS. 16-18 illustrate portions of cutter assembly 520, provided as part of header 700, in more detail. As shown by such figures, in addition to knife guard holder 524, and knife guard 526, as releasably connected by interface 530, cutter assembly 520 comprises cutter bar 720, hold downs 724, fasteners 726, knife bar or sickle bar 730 and knife sections 732. Cutter bar 720 comprises an elongate bar coupled to frame 702 and supported along the front of header 700 and along the front of drapers 706 (shown in FIG. 15). Cutter bar 720 knife guards holders 524 and knife guards 526.

Hold downs 724 comprise structures that are mounted to cutter bar 720 and that face upper surfaces of knife sections 732 to hold down such knife section 732 during reciprocation such that knife sections 732 transversely pass through the knife channels 44 of knife guards 526. Fasteners 726 extends through both mounting apertures 34 of knife guard holder 524, through corresponding apertures in cutter bar 720 and through corresponding aligned apertures of hold down 724. As a result, both knife guard holders 524 and hold down 724 are mounted on opposite sides of cutter bar 720 by a single fastener or set of fasteners 726.

Knife bar or sickle bar 730 comprises an elongate structure to which knife sections 732 are mounted. Bar 730 is connected to a head (not shown) which is connected to a reciprocating drive (not shown) that reciprocates bar 730 along the front of header 700. Knife sections 732 comprise individual knives mounted to bar 730 along the length of bar 730. Knife sections 732 are passed through knife channels 44 in fingers 42A of knife guards 526. Knife sections 732 have serrated edges that cooperate with portions of metal inserts 552 and 554 to cut the plants. As shown by FIG. 18, knife guard holder 524 comprises an upstanding vertical wall 535 that cooperates with knife guard 526 to form a channel 538 that receives bar 730 while the knife section 732 of the cutter knife extends over the top edge of the wall 535.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A cutter assembly comprising:
    a knife guard holder comprising:
        rear fastening apertures for receiving fasteners to removably connect the knife guard holder to a cutter bar;
    a knife guard having a knife channel to slidably guide a cutter knife, the knife guard comprising a plurality of fingers integrally formed as a single unitary body; and
    an interface between the knife guard holder and the knife guard to locate and releasably retain the knife guard with respect to the knife guard holder.

2. The cutter assembly of claim 1, wherein the knife guard comprises:
    a metal cutter surface along a floor of the knife channel; and a polymer outer body supporting the metal cutter surface and forming an upper surface of the knife channel.

3. The cutter assembly of claim 1, wherein the knife guard comprises:
a metal insert forming a floor of the knife channel, the metal insert comprising apertures; and
a polymer outer body projecting through the apertures and underlying the metal insert.

4. The cutter assembly of claim 1, wherein the interface comprises:
a plurality of frustro-conical projections extending from one of the knife guard holder and the knife guard; and
a plurality of frustrated-conical cavities extending into the other of the knife guard holder and the knife guard and corresponding to the plurality of frustrated-conical projections.

5. The cutter assembly of claim 1, further comprising:
the cutter bar;
a knife hold down; and
a fastener extending through the knife hold down, through the cutter bar and through the knife guard holder.

6. The cutter assembly of claim 1 further comprising:
the cutter bar;
a second knife guard holder removably connected to the cutter bar;
a second knife guard having second knife channel to slidably guide the cutter knife, the second knife guard comprising a second plurality of fingers integrally formed as a single unitary body; and
a second interface between the second knife guard holder and the second knife guard to locate and releasably retain the second knife guard with respect to the second knife guard holder.

7. The cutter assembly of claim 6, wherein the interface comprises:
a plurality of wedges integrally formed as a single unitary body with one another as part of and extending from one of the knife guard holder and the knife guard;
a plurality of wedge shaped cavities formed within an integrally formed single unitary body, the plurality of wedge-shaped cavities corresponding to the plurality of wedges and extending from the other of the knife guard holder and the knife guard, the plurality of wedge-shaped cavities releasably receiving respective ones of the plurality of wedges to locate and releasably retain the knife guard with respect to the knife guard holder.

8. The cutter assembly of claim 1, wherein the interface comprises a first portion integrally formed as a single unitary body with the knife guard holder and a second portion integrally formed as a single unitary body with the knife guard, wherein the cutter assembly further comprises:
the cutter knife; and
a knife bar supported and fastened to the cutter knife, wherein the knife bar extends over the first portion of the interface.

9. The cutter assembly of claim 1, wherein the knife guard holder further comprises an upstanding wall cooperating with the knife guard to form a knife bar channel, the cutter assembly further comprising:
a knife bar received within the knife bar channel; and
the cutter knife secured to the knife bar and extending over the upstanding wall.

10. The cutter assembly of claim 1, wherein the interface is configured to releasably retain the knife guard with respect to the knife guard holder without a fastener.

11. A cutter assembly comprising:
a knife guard holder to be removably connected to a cutter bar;
a knife guard having a knife channel to slidably guide a cutter knife; and
an interface between the knife guard holder and the knife guard to locate and releasably retain the knife guard with respect to the knife guard holder, wherein the interface comprises:
a wedge extending from one of the knife guard holder and the knife guard;
a wedge shaped cavity extending from the other of the knife guard holder and the knife guard, the wedge-shaped cavity releasably receiving the wedge to locate and releasably retain the knife guard with respect to the knife guard holder; and
a magnetic material proximate one of the wedge and the wedge-shaped cavity, wherein the other of the wedge and the wedge-shaped cavity comprises a ferrous material, the ferrous material and the magnetic material being magnetically attracted to one another to retain the wedge within the wedge-shaped cavity.

12. The cutter assembly of claim 11, wherein the interface further comprises:
a detent coupled to one of the knife guard holder and the knife guard; and
a catch coupled to the other of the knife guard holder and the knife guard, the catch being received within the detent.

13. The cutter assembly of claim 11, wherein the interface further comprises:
a retention pin extending through the wedge-shaped cavity and the wedge within the wedge-shaped cavity.

14. The cutter assembly of claim 11, wherein the interface further comprises:
a detent coupled to one of the knife guard holder and the knife guard;
a catch coupled to the other of the knife guard holder and the knife guard, the catch being received within the detent; and
a retention pin extending through the wedge-shaped cavity and the wedge within the wedge-shaped cavity.

15. A cutter assembly comprising:
a knife guard holder to be removably connected to a cutter bar;
a knife guard having a knife channel to slidably guide a cutter knife, the knife guard comprising a plurality of fingers integrally formed as a single unitary body; and
an interface between the knife guard holder and the knife guard to locate and releasably retain the knife guard with respect to the knife guard holder, wherein the knife guard holder comprises three wedge-shaped cavities and wherein the knife guard comprises:
a polymer body comprising:
the plurality of fingers, the plurality of fingers comprising:
first and second outer fingers; and
a central finger between the first and second outer fingers and having the knife channel; and
three wedge-shaped projections corresponding to the three wedge-shaped cavities and wedged into the three wedge-shaped cavities;
a first metal cutter plate continuously extending across the first and second outer fingers and the central finger, the metal cutter plate forming an upper surface of the first and second outer fingers and a floor of the knife channel; and
a second metal cutter plate supported by the central finger and forming a ceiling of the knife channel.

16. The cutter assembly of claim 15, wherein the first metal cutter plate comprises extensions encapsulated within each of the first and second outer fingers in the central finger, the extensions being received within each of the three wedge-shaped cavities of the knife guard holder.

17. The cutter assembly of claim 15, wherein the knife channel of the knife guard extends above each of the three-wedge-shaped apertures.

18. The cutter assembly of claim 15, wherein each of the three wedge-shaped cavities face in a first direction and wherein the knife guard holder comprises at least one second aperture extending in a second direction perpendicular to the first direction, the at least one second aperture to receive a fastener for removably mounting the knife guard holder to the cutter bar.

19. A cutter assembly comprising:
  a knife guard holder to be removably connected to a cutter bar;
  a knife guard having a knife channel to slidably guide a cutter knife, the knife guard comprising a plurality of fingers integrally formed as a single unitary body; and
  an interface between the knife guard holder and the knife guard to locate and releasably retain the knife guard with respect to the knife guard holder, wherein the knife guard holder comprises three wedge-shaped cavities and wherein the knife guard comprises:
  a polymer body comprising:
    the plurality of fingers, the plurality of fingers comprising:
      first and second outer fingers; and
      a central finger between the first and second outer fingers and having the knife channel;
    three wedge-shaped projections corresponding to the three wedge-shaped cavities and wedged into the three wedge-shaped cavities; and
    a dovetail projecting from an end of at least one of the three wedge-shaped projections, the dovetail projecting beyond a corresponding one of the three wedge-shaped cavities to catch on an exterior of the corresponding one of the three wedge-shaped cavities; and
  a first metal cutter plate continuously extending across the first and second outer fingers and the central finger, the metal cutter plate forming an upper surface of the first and second outer fingers and a floor of the knife channel.

20. A knife guard for a cutter assembly, the knife guard comprising:
  an integral unitary polymer body comprising:
    a bar;
    a plurality of pointed fingers forwardly projecting from the bar, at least one of the pointed fingers forming a knife channel; and
    a plurality of wedge-shaped projections projecting rearwardly from the bar to be received within a corresponding plurality of wedge-shaped cavities; and
  a first metal plate continuously extending across and secured to the plurality of pointed fingers, the first metal cutter plate forming a floor of the knife channel; and
  a second metal plate secured to the at least one of the pointed fingers forming the knife channel, the second metal plate forming a ceiling of the knife channel.

21. The knife guard of claim 20, wherein at least one of the plurality of wedge-shaped projections comprises a dovetail to catch on an exterior of the corresponding one of the plurality of wedge-shaped cavities when the plurality of wedge-shaped projections are received within the plurality of wedge-shaped cavities.

22. The knife guard of claim 20, wherein the first metal plate comprises extensions completely encapsulated by and extending within the plurality of wedge-shaped projections.

23. A cutter assembly comprising:
  a knife guard holder to be removably connected to a cutter bar;
  a knife guard having a knife channel to slidably guide a cutter knife, the knife guard comprising a plurality of fingers integrally formed as a single unitary body; and
  an interface between the knife guard holder and the knife guard to locate and releasably retain the knife guard with respect to the knife guard holder, wherein the interface comprises wedge shaped cavities provided as part of one of the knife guard holder and the knife guard and a plurality of wedges integrally formed as a single unitary body with one another as part of and extending from the other one of the knife guard holder and the knife guard, the plurality of wedges being removably received within the wedge-shaped cavities.

* * * * *